US012800357B2

(12) United States Patent
Toulon

(10) Patent No.: US 12,800,357 B2
(45) Date of Patent: Nov. 17, 2026

(54) METHOD FOR DETERMINING THE ANGULAR POSITION OF A SHAFT OF A MOTOR VEHICLE

(71) Applicant: Continental Automotive Technologies GmbH, Hannover (DE)

(72) Inventor: Dariga Toulon, Toulouse (FR)

(73) Assignee: Continental Automotive Technologies GmbH, Hannover (DE)

( * ) Notice: Subject to any disclaimer, the term of this patent is extended or adjusted under 35 U.S.C. 154(b) by 674 days.

(21) Appl. No.: 18/226,404

(22) Filed: Jul. 26, 2023

(65) Prior Publication Data

US 2024/0044673 A1 Feb. 8, 2024

(30) Foreign Application Priority Data

Aug. 5, 2022 (FR) ...................................... 2208148

(51) Int. Cl.

*G01D 5/245* (2006.01)
*G01B 7/31* (2006.01)
*G01D 5/14* (2006.01)

(52) U.S. Cl.

CPC ............. *G01D 5/2457* (2013.01); *G01B 7/31* (2013.01); *G01D 5/145* (2013.01)

(58) Field of Classification Search

CPC ......... G01D 5/2457; G01D 5/145; G01B 7/31
See application file for complete search history.

(56) References Cited

U.S. PATENT DOCUMENTS

| | | | | | |
|---|---|---|---|---|---|
| 5,239,490 | A * | 8/1993 | Masaki | G01B 7/30 | 702/41 |
| 5,637,998 | A * | 6/1997 | Kushihara | H03M 1/645 | 324/207.16 |
| 7,170,279 | B2 | 1/2007 | Haas et al. | | |
| 2004/0194557 | A1* | 10/2004 | Nagase | G01L 3/104 | 73/862.326 |
| 2008/0309527 | A1* | 12/2008 | Inoue | G01D 5/2086 | 341/116 |

(Continued)

FOREIGN PATENT DOCUMENTS

| | | | |
|---|---|---|---|
| DE | 102020102065 | B3 | 6/2021 |
| EP | 1308698 | A2 | 5/2003 |

OTHER PUBLICATIONS

French Search Report for French Application No. 2208148, dated Feb. 8, 2023 with translation, 12 pages.

*Primary Examiner* — Lina Cordero
*Assistant Examiner* — Lyudmila Zaykova-Feldman
(74) *Attorney, Agent, or Firm* — Buchanan Ingersoll & Rooney PC

(57) ABSTRACT

A method for determining the angular position of a shaft of a motor vehicle, including in particular the calculation of a first virtual angle on the basis of the values of the measured angle calculated since the zero crossing of the sine signal, plus 90°, the calculation of an intermediate compensated angle by finding the mean of the measured angle value stored for the instant and of the first virtual angle value stored for the instant, the calculation of a second virtual angle on the basis of the values of the intermediate compensated angle calculated, plus 45°, and the calculation of a final compensated angle by finding the mean of the intermediate compensated angle value stored for the instant and of the second virtual angle value stored for the instant.

10 Claims, 3 Drawing Sheets

(56) References Cited

U.S. PATENT DOCUMENTS

| | | | | |
|---|---|---|---|---|
| 2009/0105909 | A1* | 4/2009 | Yamaguchi | G01D 5/04 701/41 |
| 2014/0158453 | A1* | 6/2014 | Takaki | B62D 5/0463 180/404 |
| 2022/0009548 | A1* | 1/2022 | Nishioka | B62D 5/049 |
| 2023/0079776 | A1 | 3/2023 | Zhou | |

* cited by examiner

METHOD FOR DETERMINING THE ANGULAR POSITION OF A SHAFT OF A MOTOR VEHICLE

CROSS REFERENCE TO RELATED APPLICATIONS

This application claims priority to French Patent Application No. 2208148, filed Aug. 5, 2022, the contents of such application being incorporated by reference herein.

FIELD OF THE INVENTION

The present invention relates to the field of shaft position sensors in a motor vehicle and more particularly concerns a method for measuring the angular position of a rotating shaft of a motor vehicle by means of a target fixed at a free end of said shaft and a position sensor mounted facing said target, together with a system suitable for implementing said method.

BACKGROUND OF THE INVENTION

It is currently known practice to use a so-called "position" sensor in a motor vehicle in order to measure the angular position of a shaft relative to a reference position. For example, it is known practice to measure the angular position of a crankshaft or camshaft of an internal combustion engine in order to determine the fuel injection times into the cylinders or measure the position of a rotor shaft in an electric machine in order to control it.

As is known, the sensor is mounted facing a free end of the shaft, in the center of which is mounted a magnetic target. The sensor uses the electromagnetic response of the target to generate a sine signal and a cosine signal representative of the angular variations of the target relative to the sensor when the shaft is rotating and the arc tangent of which makes it possible to obtain an angle value signal giving the angular position of the shaft relative to the reference position. This sensor can be a TMR (tunneling magnetoresistive), GMR (giant magnetoresistive), or AMR (anisotropic magnetoresistive) sensor.

In one known solution, the sensor comprises an electronic circuit on which are mounted a first Wheatstone bridge making it possible to generate the sine signal and a second Wheatstone bridge making it possible to generate the cosine signal. In the case of an AMR sensor, the first Wheatstone bridge and the second Wheatstone bridge are mechanically offset by an angle of 45°. In the case of a GMR or TMR sensor, the first Wheatstone bridge and the second Wheatstone bridge are mechanically offset by an angle of 90°.

An eccentricity tolerance is permitted when the sensor is mounted relative to the center of the target. Likewise, an angularity tolerance is permitted between the electronic circuit and the target, which should ideally be parallel. However, these tolerances result in an error in the value of the angular position delivered by the sensor. In particular, the more the sensor is offset relative to the center of the target, and therefore from the axis of rotation of the shaft, the more the angular error increases.

FIG. 1 shows the variation in the error Err (in degrees) observed between the calculated angle and the actual angle (in degrees) as a function of the actual angle ANG (in degrees) of the shaft. It can be seen that the error Err between the calculation performed by the sensor and the actual angular position ANG of the shaft can be up to approximately plus or minus 8°.

One solution would consist of ensuring the centered, parallel placement of the sensor and the target, but the mounting constraints on production lines always involve tolerances. FIG. 2 shows the error Err (in degrees) observed between the calculated angle and the actual angle (in degrees) as a function of the actual angle ANG (in degrees) of the shaft. It can be seen that the error Err between the calculation performed by the sensor and the actual angular position ANG of the shaft can be up to approximately plus or minus 0.12° for an eccentricity offset of 0.25 mm. Another solution consists of processing the angle value signal by filtering in order to reduce the error. However, the effectiveness of such processing can be limited, in particular as it only works correctly at a fixed frequency. In addition, processing the angle value signal by filtering requires significant processing capacity, in terms of both hardware and software, which is another drawback.

It would therefore be advantageous to propose a solution that makes it possible to at least partly overcome these drawbacks.

SUMMARY OF THE INVENTION

An aspect of the invention aims to further reduce the error in the measurement of the angular position of a rotating shaft by a position sensor in a motor vehicle. An aspect of the invention aims to reduce the measurement error generated by the misalignment and/or the non-parallelism of a position sensor relative to a target fixed on the free end of a rotating shaft in a motor vehicle. An aspect of the invention—aims to provide a simple, reliable and effective solution for reducing the measurement error of a motor vehicle position sensor.

To this end, an aspect of invention firstly relates to a method for determining the angular position of a shaft of a motor vehicle by means of a target fixed to a free end of said shaft and comprising a magnetic element, and a magnetoresistive position sensor mounted facing said target, said method comprising the steps of:

at each instant:

rotating the shaft, generating a sine signal and a cosine signal, compensating for the amplitude and offset of the signals generated, storing the compensated sine signal values in a first memory area, storing the compensated cosine signal values in a second memory area, calculating the so-called "measured" angle in real time on the basis of the compensated sine and cosine signals, storing the measured angle calculated in a third memory area, during a first rotation of the shaft:

detecting the zero crossing of the compensated sine signal characterizing a first angular position of the shaft, detecting the zero crossing of the compensated cosine signal characterizing a second angular position of the shaft offset by 90° relative to the first angular position, on the basis of the detection of the zero crossing of the cosine signal, at each instant:

calculating a first virtual angle on the basis of the calculated measured angle calculated values stored in the third memory area since the zero crossing of the sine signal, plus 90°, calculating an intermediate compensated angle by finding the mean of the measured angle value stored for said instant and of the first virtual angle value stored for said instant, storing the intermediate compensated angle values in a fourth memory area, during a second rotation of the shaft:

detecting the zero crossing of the compensated sine signal characterizing the first angular position of the shaft, detecting the zero crossing of the difference between the compensated sine signal and the compensated cosine signal characterizing a third angular position of the shaft offset by 45° relative to the first angular position, on the basis of the zero crossing of the difference between the compensated sine signal and the compensated cosine signal, at each instant:

calculating a second virtual angle on the basis of the calculated intermediate compensated angle values stored in the fourth memory area since the zero crossing of the sine signal, plus 45°, calculating a final compensated angle by finding the mean of the intermediate compensated angle value stored for said instant and of the second virtual angle value stored for said instant.

Compensating for the amplitude and offset of the signals generated makes it possible to detect the zero crossing of the sine and cosine signals and of the difference between the sine signal and the cosine signal. Calculating the intermediate compensated angle makes it possible to eliminate the second harmonic of the angular error signal. Calculating the final compensated angle makes it possible to eliminate the fourth harmonic of the angular error signal and thus obtain an output angular signal with a significantly small error, with an amplitude of less than 0.20° as an absolute value compared with 2° of error with the known solution for an eccentricity offset of 1 mm. The calculation is simple and does not require significant processing capacity compared with the Fourier transform correction solution of the prior art.

Preferably, the zero crossing of the compensated sine signal detected is a crossing from negative to positive of the amplitude of said compensated sine signal.

Preferably, the zero crossing of the compensated cosine signal detected is a crossing from positive to negative of the amplitude of said compensated cosine signal.

Preferably, the zero crossing of the difference between the compensated sine signal value and the compensated cosine signal value detected is a crossing from negative to positive.

Preferably, the method comprises a step of storing the compensated final angle values in a fifth memory area.

Preferably, the method comprises a step of comparing, at each instant, the compensated final angle value stored at said instant and the measured angle value stored at said instant.

Preferably, the method comprises a step of sending a fault message when the difference between the compensated final angle value stored at said instant and the measured angle value stored at said instant is greater than a predetermined warning threshold.

An aspect of the invention also relates to a computer program product characterized in that it contains a set of program code instructions that, when they are executed by one or more processors, configure the one or more processors to implement a method as set out above.

An aspect of the invention also relates to a system for determining the angular position of a shaft of a motor vehicle by means of a target fixed to a free end of said shaft and comprising a magnetic element, and a magnetoresistive position sensor mounted facing said target, said system comprising said sensor, said sensor being configured to generate a sine signal and a cosine signal representative of the angular position of the shaft, the system being configured to:

at each instant:

compensate for the amplitude and offset of the signals generated by the sensor, store the compensated sine signal values in a first memory area, store the compensated cosine signal values in a second memory area, calculate the so-called "measured" angle in real time on the basis of the compensated sine and cosine signals, store the measured angle calculated in a third memory area, during a first rotation of the shaft:

detect the zero crossing of the compensated sine signal characterizing a first angular position of the shaft, detect the zero crossing of the compensated cosine signal characterizing a second angular position of the shaft offset by 90° relative to the first angular position, on the basis of the detection of the zero crossing of the cosine signal, at each instant:

calculate a first virtual angle on the basis of the calculated measured angle values stored in the third memory area since the zero crossing of the sine signal, plus 90°, calculate an intermediate compensated angle by finding the mean of the measured angle value stored for said instant and of the first virtual angle value stored for said instant, store the intermediate compensated angle values in a fourth memory area, during a second rotation of the shaft:

detect the zero crossing of the compensated sine signal characterizing the first angular position of the shaft, detect the zero crossing of the difference between the compensated sine signal and the compensated cosine signal characterizing a third angular position of the shaft offset by 45° relative to the first angular position, on the basis of the zero crossing of the difference between the compensated sine signal and the compensated cosine signal, at each instant:

calculate a second virtual angle on the basis of the calculated intermediate compensated angle values stored in a fourth memory area since the zero crossing of the sine signal, plus 45°, calculate a final compensated angle by finding the mean of the intermediate compensated angle value stored for said instant and of the second virtual angle value stored for said instant.

Preferably, the system is configured to detect the zero crossing of the compensated sine signal by detecting a crossing from negative to positive of the amplitude of said compensated sine signal.

Preferably, the system is configured to detect the zero crossing of the compensated cosine signal by detecting a crossing from positive to negative of the amplitude of said compensated cosine signal.

Preferably, the system is configured to detect the zero crossing of the difference between the compensated sine signal value and the compensated cosine signal value by detecting a crossing from negative to positive.

Preferably, the system is configured to store the compensated final angle values in a fifth memory area.

Preferably, the system is configured to compare, at each instant, the compensated final angle value stored at said instant and the measured angle value stored at said instant.

Preferably, the system is configured to send a fault message when the difference between the compensated final angle value stored at said instant and the measured angle value stored at said instant is greater than a predetermined warning threshold.

An aspect of the invention also relates to a motor vehicle comprising a drive shaft and a system as set out above.

BRIEF DESCRIPTION OF THE DRAWINGS

Other features and advantages of aspects of the invention will become more apparent upon reading the description that follows. This description is purely illustrative and should be read with reference to the appended drawings, in which.

DETAILED DESCRIPTION OF THE PREFERRED EMBODIMENTS

Figure 1:
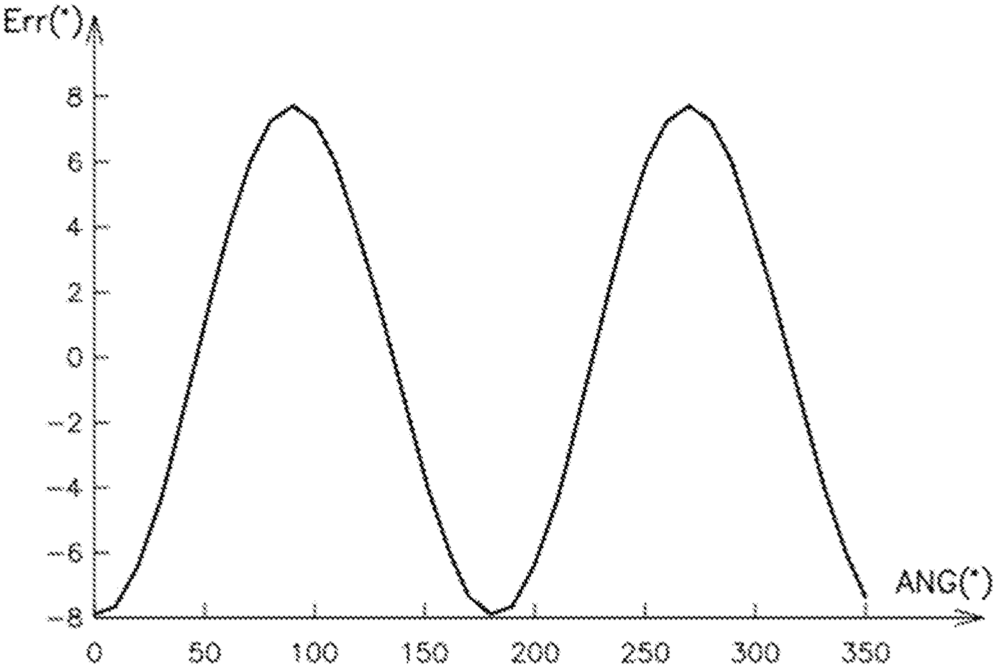
FIG. 1 illustrates an example of a signal representing the error between the angular position of a shaft calculated by a position sensor and the actual angle of the shaft in the absence of correction.
Figure 2:
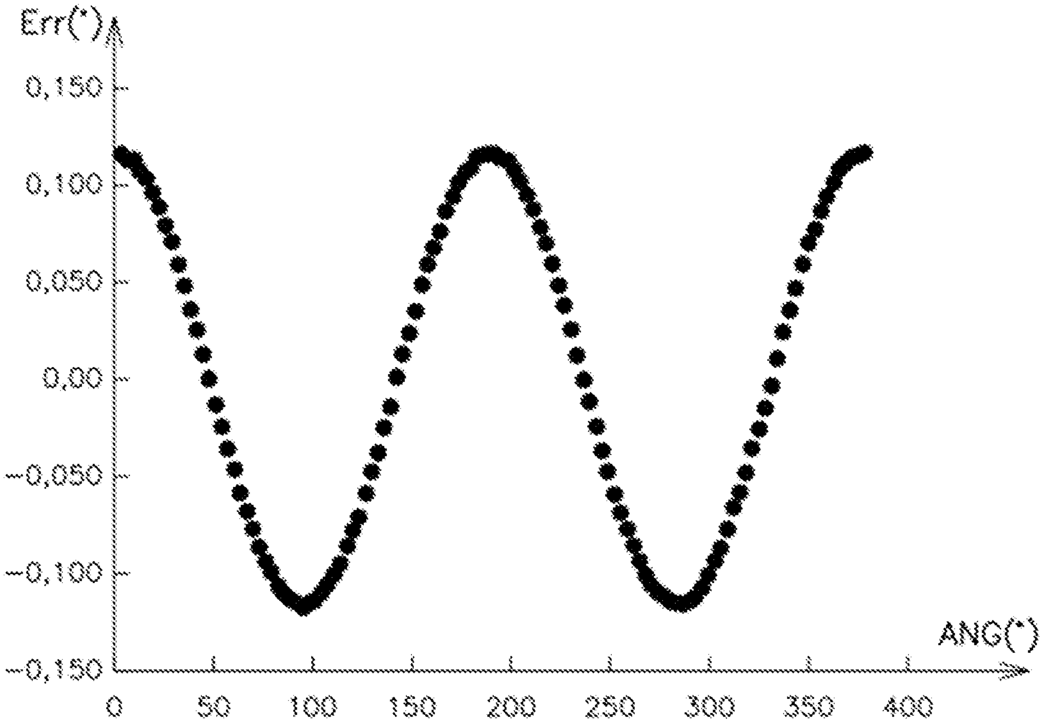
FIG. 2 illustrates an example of a signal representing the error between the angular position of a shaft calculated by a position sensor and the actual angle of the shaft with an eccentricity offset of 0.25 mm.
Figure 3:
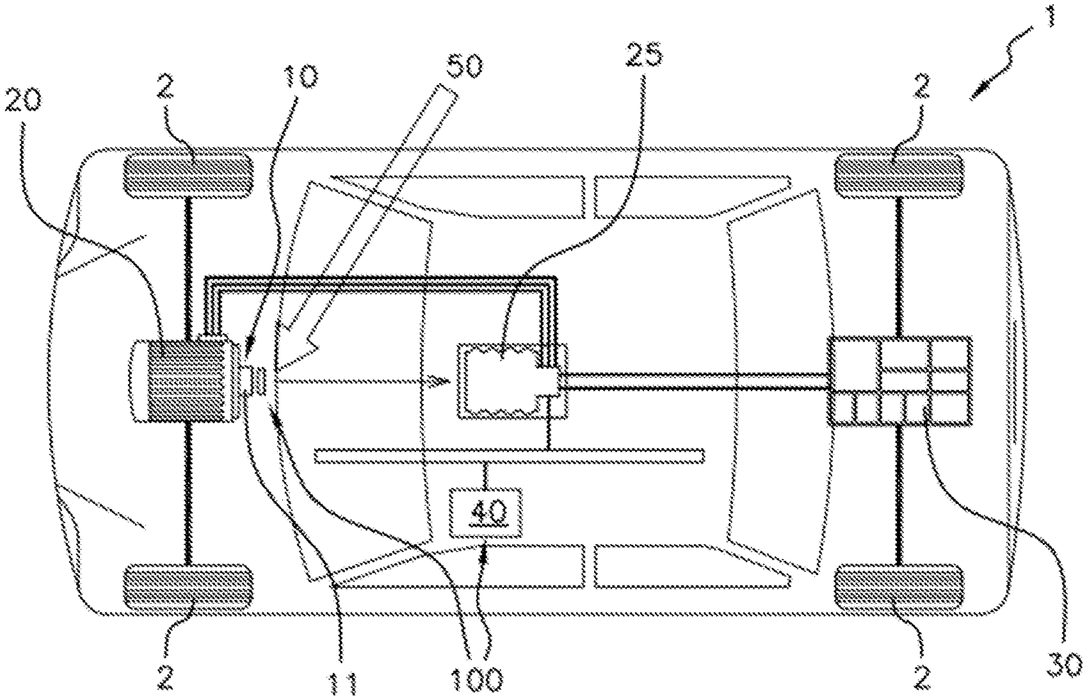
FIG. 3 schematically illustrates one embodiment of the system according to the invention.

FIG. 3 shows an example of a vehicle 1 according to an aspect of the invention.

In this non-limiting example, the vehicle 1 is an electric vehicle comprising an electric drive machine comprising a rotor 10 and a stator 20. The electric machine is powered by an electric battery 30 and is controlled by an electronic control unit 40 via a converter 25 and using a sensor 50.

The rotor 10 comprises a rotating central shaft 11 making it possible to drive the wheels 2 of the vehicle 1 via a transmission line (not shown for the sake of clarity). It will be noted that in this example, the shaft 11 is a shaft of a rotor 10 but this in no way limits the scope of an aspect of the present invention, and the shaft 11 can be any type of rotating shaft of a motor vehicle.

Figure 4:
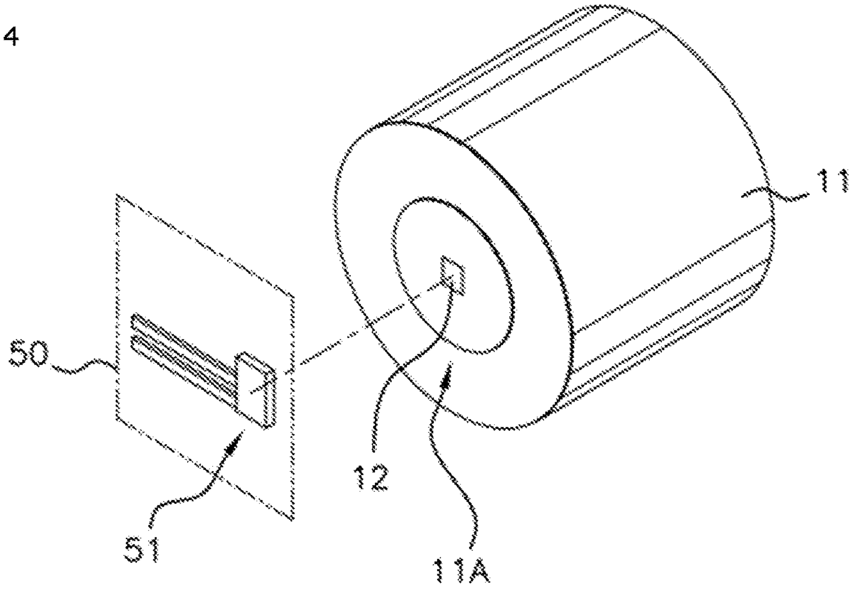
FIG. 4 schematically illustrates one arrangement of the position sensor and drive shaft.

With reference to FIG. 4, the shaft 11 takes the form of a rod extending in a longitudinal direction from the body of the rotor 10 and comprising a free end 11A. In this example, the shaft 11 is a transmission shaft, but it could equally be, in one embodiment, a crankshaft, a camshaft, a steering shaft of any shaft of the vehicle 1 the angular position of which must be measured, for example in order to allow the satisfactory operation of the motor of the vehicle 1.

The free end 11A of the shaft 11 comprises a target 12, taking the form of a disk for example, mounted coaxially with the shaft 11, that is, the center of the target 12 is coincident with the longitudinal axis of the shaft 11. The target 12 comprises a centered magnetic element at its center. This magnetic element can be a portion of the target 12 or an additional element fixed in the center of the target 12.

The vehicle 1 also comprises a system 100 according to an aspect of the invention.

In this example, the system 100 comprises the electronic control unit 40, the sensor 50 and a plurality of memory areas (not visible) that can be implemented in the electronic control unit 40 and/or in the sensor 50 and/or in another location in the system 100.

The sensor 50 is a magnetoresistive sensor, for example a TMR (tunneling magnetoresistive) sensor. The sensor 50 is mounted facing the magnetic element of the target 12 of the shaft 11, substantially centered and coaxial therewith.

The sensor 50, which is placed on support 51, is configured to generate a sinusoidal signal, known as a sine signal, and a cosinusoidal signal, known as a cosine signal, representative of the electromagnetic variations of the magnet when the shaft 11 is rotated.

The system 100, that is the electronic control unit 40 and/or the sensor 50, is configured to, at each instant, compensate for the amplitude and offset of the signals generated by the sensor, to store the compensated sine signal values in a first memory area, to store compensated cosine signal values in a second memory area, to calculate the so-called "measured" angle in real time on the basis of the compensated sine and cosine signals, and to store the measured angle calculated in a third memory area.

"At each instant" is given to mean continuously or in real time, electronically by periodic time samples, in a manner known per se, for example every N milliseconds where N is a natural number.

During the first rotation of the shaft 11, the system 100 is configured to detect the zero crossing of the compensated sine signal characterizing a first angular position of the shaft 11 and to detect the zero crossing of the compensated cosine signal characterizing a second angular position of the shaft 11 offset by 90° relative to the first angular position.

On the basis of the detection of the zero crossing of the cosine signal, the system 100 is configured to, at each instant: calculate a first virtual angle on the basis of the measured angle values stored in the third memory zone since the zero crossing of the sine signal, plus 90°, calculate a calculate an intermediate compensated angle by finding the mean of the measured angle value stored for said instant and of the first virtual angle value stored for said instant, and store the intermediate compensated angle values in a fourth memory area.

During a second rotation of the shaft 11, the system 100 is configured to detect the zero crossing of the compensated sine signal characterizing the first angular position of the shaft 11 and to detect the zero crossing of the difference between the compensated sine signal and the compensated cosine signal characterizing a third angular position of the shaft 11 offset by 45° relative to the first angular position.

On the basis of the zero crossing of the difference between the compensated sine signal and the compensated cosine signal, the system 100 is configured to, at each instant: calculate a second virtual angle on the basis of the calculated intermediate compensated angle values stored in the fourth memory zone since the zero crossing of the sine signal, plus 45°, and calculate a final compensated angle by finding the mean of the intermediate compensated angle value stored for said instant and of the second virtual angle value stored for said instant.

The system 100 comprises at least one processor capable of implementing a set of instructions allowing these functions to be performed.

Exemplary Embodiment

Figure 5:
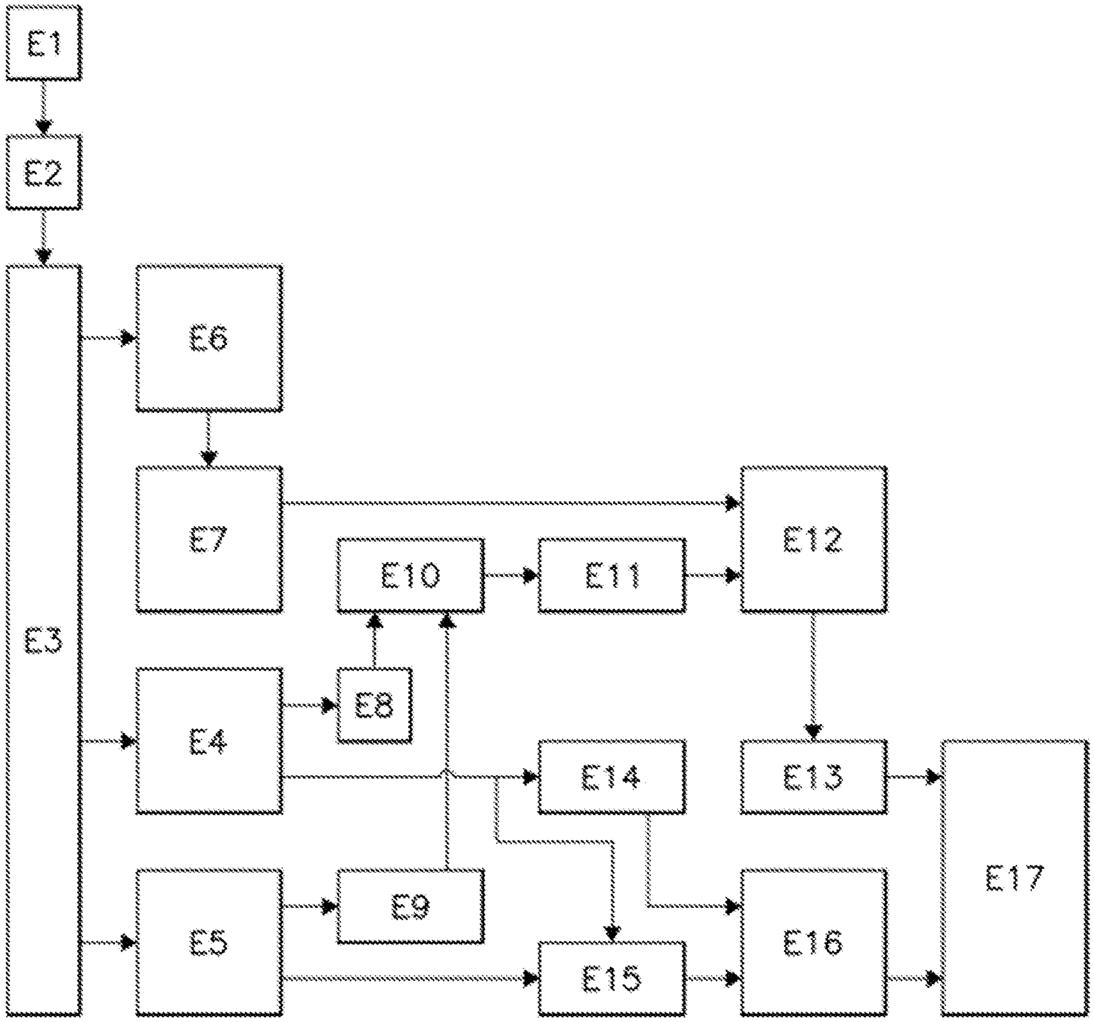
FIG. 5 schematically illustrates one embodiment of the method according to the invention.

An exemplary embodiment of the method according to the invention will now be described with reference to FIG. 5.

First, the shaft 11 is rotated in a step E1.

As soon as the shaft 11 is rotated, at each instant, the sensor 50 starts to generate a sine signal and a cosine signal in a step E2.

As the shaft 11 rotates and the sine and cosine signals are generated, the amplitude and offset of the sine and cosine signals are compensated for at each instant in a step E3. Since amplitude and offset compensation is known per se, it will not be described in more detail here.

Next, each value of the measured compensated sine signal is stored in a first storage area of the system 100 in a step E4 and each value of the measured compensated cosine signal is stored in a second storage area of the system 100 in a step E5.

The so-called "measured" angle is calculated by the system 100 in real time on the basis of the compensated sine and cosine signals in a step E6. The measured angle is determined by calculating the arc tangent of the compensated sine and cosine signals.

The measured angle calculated is stored in a third memory area of the system 100 in a step E7.

During the first rotation of the shaft 11, the zero crossing of the compensated sine signal characterizing a first angular position of the shaft 11 is detected in a step E8. During this time, steps E2 to E7 are implemented.

Next, the zero crossing of the compensated cosine signal characterizing a second angular position of the shaft 11 offset by 90° relative to the first angular position is detected in a step E9.

On the basis of the detection of the zero crossing of the cosine signal, at each instant, with steps E2 to E7 still being carried out in parallel, in a step E10 a first virtual angle is calculated on the basis of the values of the measured angle calculated in step E6 stored in the third memory area since the zero crossing of the sine signal, plus 90°.

Each value (i.e. at each instant) of the first virtual angle calculated can optionally be stored in a fourth memory area of the system 100 in a step E11.

Then, an intermediate compensated angle is calculated at each instant by finding the mean of the measured angle value stored for said instant and of the first virtual angle value stored for said instant in a step E12.

The values of the intermediate compensated angle calculated at each instant are stored in a fourth memory area of the system 100 in a step E13.

Next, during a second rotation of the shaft 11, with steps E2 to E7 still being implemented, the zero crossing of the compensated sine signal characterizing the first angular position of the shaft 11 is detected in a step E14, then the zero crossing of the difference between the compensated sine signal and the compensated cosine signal characterizing a third angular position of the shaft 11 offset by 45° relative to the first angular position is detected in a step E15.

On the basis of the zero crossing of the difference between the compensated sine signal and the compensated cosine signal, at each instant, in a step E16, the system 100 calculates a second virtual angle on the basis of the calculated intermediate compensated angle values stored in the fourth memory area since the zero crossing of the sine signal, plus 45°.

Next, the system 100 calculates a final compensated angle by finding the mean of the intermediate compensated angle value stored for said instant and of the second virtual angle value stored for said instant in a step E17.

As set out above, steps E3 to E17 can be implemented entirely by the sensor 50 or entirely by the electronic control unit 40. As a variant, some of steps E3 to E17 can be implemented by the sensor 50 and the subsequent steps by the electronic control unit 40.

The invention claimed is:

1. A method for determining an angular position of a shaft of a motor vehicle by a target fixed to a free end of said shaft and comprising a magnetic element, and a magnetoresistive position sensor mounted facing said target, said method comprising:
- at each instant:
  - rotating the shaft,
  - generating a sine signal and a cosine signal,
  - compensating for an amplitude and offset of the signals generated,
  - storing compensated sine signal values in a first memory area,
  - storing compensated cosine signal values in a second memory area,
  - calculating a so-called measured angle in real time on the basis of the compensated sine and cosine signals,
  - storing a measured angle calculated in a third memory area;
- during a first rotation of the shaft:
  - detecting a zero crossing of the compensated sine signal characterizing a first angular position of the shaft,
  - detecting a zero crossing of the compensated cosine signal characterizing a second angular position of the shaft offset by 90° relative to the first angular position;
- on the basis of the detection of the zero crossing of the cosine signal, at each instant:
  - calculating a first virtual angle on the basis of calculated measured angle values stored in the third memory area since the zero crossing of the sine signal, plus 90°,
  - calculating an intermediate compensated angle by finding a mean of the measured angle value stored for said instant and of the first virtual angle value stored for said instant,
  - storing the intermediate compensated angle values in a fourth memory area;
- during a second rotation of the shaft:
  - detecting the zero crossing of the compensated sine signal characterizing the first angular position of the shaft,
  - detecting the zero crossing of the difference between the compensated sine signal and the compensated cosine signal characterizing a third angular position of the shaft offset by 45° relative to the first angular position;
- on the basis of the zero crossing of the difference between the compensated sine signal and the compensated cosine signal, at each instant:
  - calculating a second virtual angle on the basis of the calculated intermediate compensated angle values stored in the fourth memory area since the zero crossing of the sine signal, plus 45°,
  - calculating a final compensated angle by finding the mean of the intermediate compensated angle value stored for said instant and of the second virtual angle value stored for said instant; and
- at least one of adjusting fuel injection times of an engine of the motor vehicle or controlling an electric machine of the motor vehicle based on the determined angular position of the shaft.

2. The method as claimed in claim 1, wherein the zero crossing of the compensated sine signal detected is a crossing from negative to positive of the amplitude of said compensated sine signal.

3. The method as claimed in claim 1, wherein the zero crossing of the compensated cosine signal detected is a crossing from positive to negative of the amplitude of said compensated cosine signal.

4. The method as claimed in claim 1, wherein the zero crossing of the difference between the compensated sine signal value and the compensated cosine signal value detected is a crossing from negative to positive.

5. A non-transitory computer program product, comprising a set of program code instructions that, when executed by one or more processors, configure the one or more processors to implement a method as claimed in claim 1.

6. A system for determining an angular position of a shaft of a motor vehicle by a target fixed to a free end of said shaft and comprising a magnetic element, and a magnetoresistive position sensor mounted facing said target, said system comprising said sensor, said sensor being configured to generate a sine signal and a cosine signal representative of the angular position of the shaft, the system being configured to:

at each instant:

compensate for an amplitude and offset of the signals generated by the sensor, store compensated sine signal values in a first memory area, store compensated cosine signal values in a second memory area, calculate the so-called measured angle in real time on the basis of the compensated sine and cosine signals, store a measured angle calculated in a third memory area, during a first rotation of the shaft:

detect the zero crossing of the compensated sine signal characterizing a first angular position of the shaft, detect the zero crossing of the compensated cosine signal characterizing a second angular position of the shaft offset by 90° relative to the first angular position, on the basis of the detection of the zero crossing of the cosine signal, at each instant:

calculate a first virtual angle on the basis of the calculated measured angle values stored in the third memory area since the zero crossing of the sine signal, plus 90°, calculate an intermediate compensated angle by finding a mean of the measured angle value stored for said instant and of the first virtual angle value stored for said instant, store the intermediate compensated angle values in a fourth memory area, during a second rotation of the shaft:

detect the zero crossing of the compensated sine signal characterizing the first angular position of the shaft, detect the zero crossing of the difference between the compensated sine signal and the compensated cosine signal characterizing a third angular position of the shaft offset by 45° relative to the first angular position, on the basis of the zero crossing of the difference between the compensated sine signal and the compensated cosine signal, at each instant:

calculate a second virtual angle on the basis of the calculated intermediate compensated angle values stored since the zero crossing of the sine signal, plus 45°, calculate a final compensated angle by finding the mean of the intermediate compensated angle value stored for said instant and of the second virtual angle value stored for said instant; and at least one of adjust fuel injection times of an engine of the motor vehicle or control an electric machine of the motor vehicle based on the determined angular position of the shaft.

7. The system as claimed in claim 6, configured to detect the zero crossing of the compensated sine signal by detecting a crossing from negative to positive of the amplitude of said compensated sine signal.

8. The system as claimed in claim 6, wherein the system is configured to detect the zero crossing of the compensated cosine signal by detecting a crossing from positive to negative of the amplitude of said compensated cosine signal.

9. The system as claimed claim 6, wherein the system is configured to detect the zero crossing of the difference between the compensated sine signal value and the compensated cosine signal value by detecting a crossing from negative to positive.

10. The motor vehicle comprising a drive shaft and the system as claimed in claim 6.

* * * * *